US010108732B2

(12) United States Patent
Godsey et al.

(10) Patent No.: US 10,108,732 B2
(45) Date of Patent: Oct. 23, 2018

(54) SOCIAL WALLET

(71) Applicant: PayPal, Inc., San Jose, CA (US)

(72) Inventors: Sandy Lynn Godsey, San Jose, CA (US); Corinne Elizabeth Sherman, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 468 days.

(21) Appl. No.: 14/192,190

(22) Filed: Feb. 27, 2014

(65) Prior Publication Data

US 2015/0242424 A1    Aug. 27, 2015

(51) Int. Cl.
*G06F 17/30*    (2006.01)
*G06Q 10/10*    (2012.01)
*G06Q 50/00*    (2012.01)

(52) U.S. Cl.
CPC ......... *G06F 17/3089* (2013.01); *G06Q 10/10* (2013.01); *G06Q 50/01* (2013.01)

(58) Field of Classification Search
CPC ......... G06F 17/30958; G06F 17/30867; G06F 17/3089; G06F 17/30554; G06F 17/30528; G06F 17/3053; G06F 17/30017; G06F 17/3064; G06F 17/30011; G06F 17/30029; G06F 17/30864; G06Q 50/01; G06Q 10/10

See application file for complete search history.

(56) References Cited

U.S. PATENT DOCUMENTS

| | | | | |
|---|---|---|---|---|
| 9,047,644 B1* | 6/2015 | Terleski | ................. | H04L 51/32 |
| 2008/0267091 A1* | 10/2008 | Parkkinen | ............... | H04L 12/66 370/255 |
| 2010/0030715 A1* | 2/2010 | Eustice | ................. | G06Q 10/10 706/12 |
| 2011/0105143 A1* | 5/2011 | Harple | .............. | G06F 17/30241 455/456.1 |
| 2012/0290652 A1* | 11/2012 | Boskovic | ............... | G06Q 50/30 709/204 |
| 2013/0262588 A1* | 10/2013 | Barak | ..................... | H04L 67/22 709/204 |
| 2014/0040246 A1* | 2/2014 | Rubinstein | ........ | G06F 17/30554 707/722 |

(Continued)

OTHER PUBLICATIONS

Zeevi, Daniel, "Top 10 Social Media Management Tools", Social Media Today, [Online]. Retrieved from the Internet: <URL: http://tw.r.w.socialmediatoday.com/contentltop-10-social-media-management-tools>, (Apr. 9, 2013), 5 pgs.

*Primary Examiner* — Scott A. Waldron
*Assistant Examiner* — Andalib F Lodhi
(74) *Attorney, Agent, or Firm* — Maschoff Brennan

(57) ABSTRACT

A system comprising a computer-readable storage medium storing at least one program and a computer-implemented method for providing social graph maintenance services is presented. Consistent with some embodiments, the method may include accessing a social graph of a subject user. The social graph may include a plurality of nodes representing objects to which the subject user has a relationship and a plurality of edges representing the relationships. The method may further include determining that a particular node lacks relevance to the subject user. In response to determining that the particular node lacks relevance to the subject user, the relationship with the particular node is eliminated.

15 Claims, 9 Drawing Sheets

(56) References Cited

U.S. PATENT DOCUMENTS

| | | | |
|---|---|---|---|
| 2014/0237046 A1* | 8/2014 | Brooks | G06Q 50/01 709/204 |
| 2015/0206088 A1* | 7/2015 | Gouvernel | G06Q 10/06393 705/7.39 |
| 2016/0246789 A1* | 8/2016 | Wu | G06F 17/3053 |

* cited by examiner

SOCIAL WALLET

TECHNICAL FIELD

This application relates to data processing. In particular, example embodiments may relate to systems and methods for social graph maintenance.

BACKGROUND

A social graph is a data structure representing personal relations of internet users. Social graphs traditionally include nodes representing people (e.g., members of a social network), places (e.g., geo-graphic locations, websites or webpages), things (e.g., content, events, applications), and edges representing the relationships between nodes. Social network services such as Facebook, Twitter, and Pinterest often maintain social graphs for each of their members. However, individual users' social graphs may be duplicated across multiple social networking services, and each social networking service may be unaware of the relationships forged using a different social networking service.

These social network services also allow users to modify, maintain, or otherwise control their respective social graphs through varied social actions such as sending "friend" requests to other users, "following" other users or content created by other users, "liking" or "favoriting" content, or reversing such social actions. As the tastes, preferences, and affinities of users may be ever evolving, the upkeep involved in maintaining a relevant and up-to-date social graph may be an onerous and tedious task.

BRIEF DESCRIPTION OF THE DRAWINGS

Various ones of the appended drawings merely illustrate example embodiments of the present invention and cannot be considered as limiting its scope.

DETAILED DESCRIPTION

Figure 1:
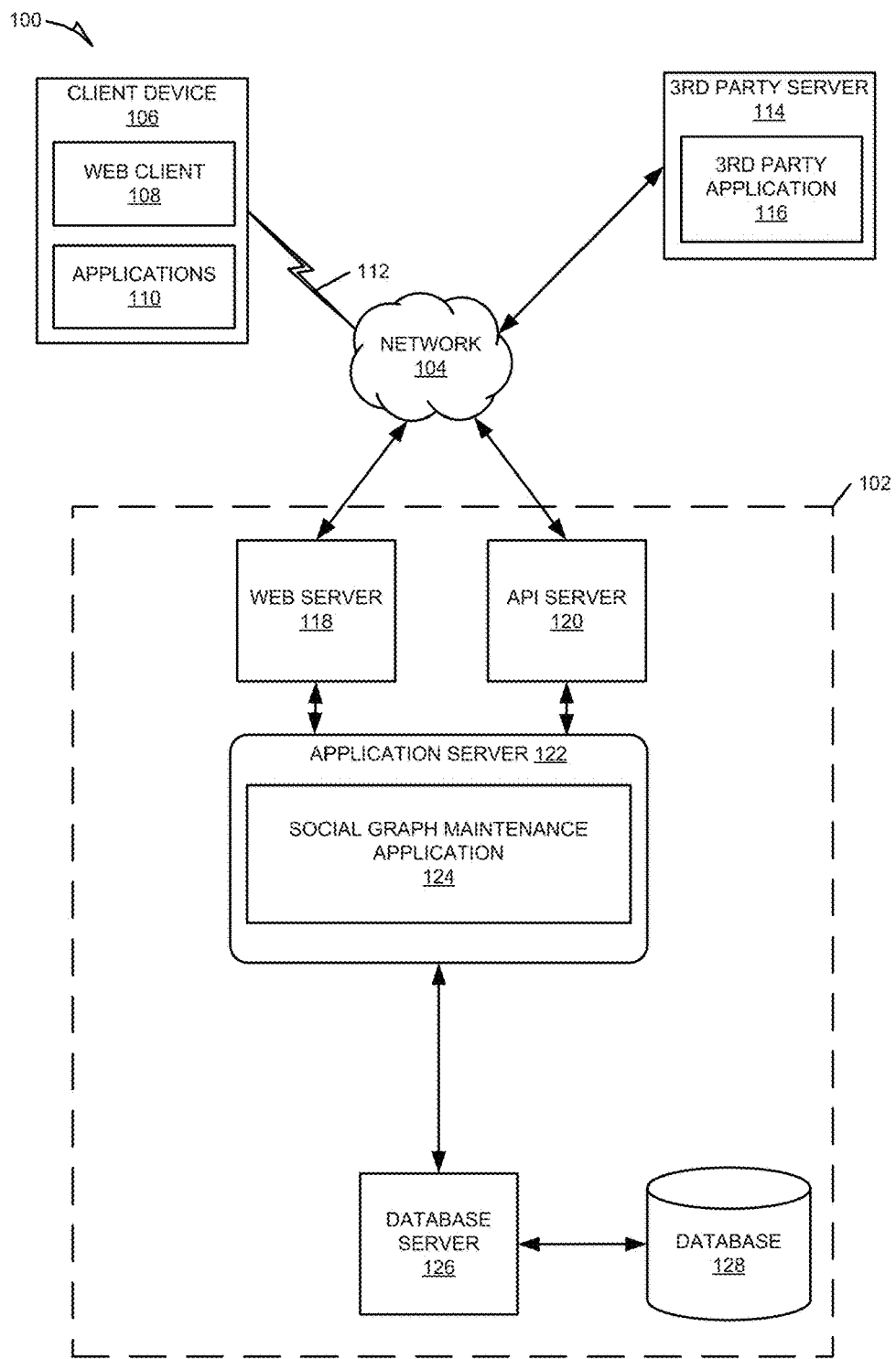
FIG. 1 is a network diagram depicting a network system having a client-server architecture configured for exchanging data over a network with a content publisher, according to an example embodiment.

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details. In accordance with the present disclosure, components, process steps, and data structures may be implemented using various types of operating systems, programming languages, computing platforms, computer programs, and/or general purpose machines.

Aspects of the present disclosure include systems and methods for providing social graph maintenance services. Consistent with some embodiments, a method may include accessing and aggregating social data about a subject user from a number of social network services. As used herein, a "user" or an "entity" may be a person (e.g., a human), a business (e.g., a company), an organization, a group of people, a persona (e.g., a fictitious character), a bot, or any combination thereof. A social graph including all of the connections of the user (e.g., from the number of social network services) may be generated from the aggregated social data. The social graph may include a focal node representing the subject user and a plurality of nodes representing objects to which the subject user has a relationship. The social graph may further include a plurality of edges representing the subject user's relationships with the various nodes.

Consistent with some embodiments, the method may further include maintaining engagement criteria for one or more actions that may be initiated with respect to each node of the social graph, and initiating such actions based on fulfillment of the engagement criteria. For example, the engagement criteria may include relevance criteria for automatically terminating or eliminating a relationship with a node. As further examples, the engagement criteria may also be used to provide suggestions of new applications and social network services, send privacy information to members of a social network, send a unified profile information to social network services, implement a change to one or more networks, track activity in a given network, and provide comprehensive analytics of activity to a social network service provider.

In some embodiments, a method may include accessing a social graph of a subject user. The method may further include determining that a particular node lacks relevance to the subject user. The determination that the particular node lacks relevance to the subject user may be based on inactivity with respect to the particular node, consistent with some embodiments. In some embodiments, such a determination may take into account the normal routine of the user in using various services and applications, and in interacting with the objects represented by the nodes.

In response to determining that the particular node lacks relevance to the subject user, the relationship with the particular node is eliminated. The elimination of the relationship may include interacting or communicating with one or more third party services or applications to terminate the relationship. Consistent with some embodiments, a notification may be sent to the subject user prior to or subsequent to the elimination of the particular node from the social graph of the subject user.

FIG. 1 is a network diagram depicting a network system 100, according to one embodiment, having a client-server architecture configured for exchanging data over a network. The network system 100 may include a network-based content publisher 102 in communication with a client device 106 and a third party server 114. In some example embodiments, the network-based content publisher 102 may be a network-based marketplace.

The network-based content publisher 102 may communicate and exchange data within the network system 100 that may pertain to various functions and aspects associated with the network system 100 and its users. The network-based content publisher 102 may provide server-side functionality, via a network 104 (e.g., the Internet), to one or more client devices (e.g., client device 106). The one or more client devices 106 may be operated by users that use the network system 100 to exchange data over a network 104. These transactions may include transmitting, receiving (communicating), and processing data to, from, and regarding content and users of the network system 100. The data may include, but are not limited to: images; video or audio content; user preferences; product and service feedback, advice, and reviews; product, service, manufacturer, and vendor recommendations and identifiers; product and service listings associated with buyers and sellers; product and service advertisements; auction bids; transaction data; and social data, among other things.

In various embodiments, the data exchanged within the network system 100 may be dependent upon user-selected functions available through one or more client or user interfaces (UIs). The UIs may be associated with a client device, such as the client device 106 using web client 108. The web client 108 may be in communication with the network-based content publisher 102 via a web server 118. The UIs may also be associated with one or more applications 110 executing on the client device 106, such as a client application designed for interacting with the network-based content publisher 102, or the third party server 114 (e.g., one or more servers or client devices 106) hosting a third party application 116.

The client device 106 may be any of a variety of types of devices. For example, the client device 106 may a mobile device such as an iPhone® or other mobile device running the iOS® operating system, the Android® operating system, a BlackBerry® operating system, the Microsoft® Windows® Phone operating system, Symbian® OS, or webOS®. Consistent with some embodiments, the client device 106 may alternatively be a tablet computer, such as an iPad® or other tablet computer running one of the aforementioned operating systems. In some embodiments, the client device 106 may also be a personal digital assistant (PDA), a personal navigation device (PND), a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, or a video game system console such as the Nintendo Wii®, the Microsoft Xbox 360®, or the Sony PlayStation 3®, or other video game system consoles.

The client device 106 may interface via a connection 112 with the communication network 104 (e.g., the Internet or wide area network (WAN)). Depending on the form of the client device 106, any of a variety of types of connection 112 and communication networks 104 may be used. For example, the connection 112 may be code division multiple access (CDMA) connection, a Global System for Mobile communications (GSM) connection, or other type of cellular connection. Such a connection 112 may implement any of a variety of types of data transfer technology, such as single carrier radio transmission technology (1×RTT), Evolution-Data Optimized (EVDO) technology, general packet radio service (GPRS) technology, enhanced data rates for GSM evolution (EDGE) technology, or other data transfer technology (e.g., fourth generation wireless, 4G networks). When such technology is employed, the communication network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or to other types of networks).

In another example, the connection 112 may be wireless fidelity (Wi-Fi, IEEE 802.11x type) connection, a Worldwide Interoperability for Microwave Access (WiMAX) connection, or another type of wireless data connection. In such an embodiment, the communication network 104 may include one or more wireless access points coupled to a local area network (LAN), a WAN, the Internet, or other packet-switched data network. In yet another example, the connection 112 may be a wired connection, for example an Ethernet link, and the communication network 104 may be a LAN, a WAN, the Internet, or other packet-switched data network. Accordingly, a variety of different configurations are expressly contemplated.

FIG. 1 also illustrates the third party application 116 executing on the third party server 114 that may offer one or more services to users of the client device 106. The third party application 116 may have programmatic access to the network-based content publisher 102 via the programmatic interface provided by an application program interface (API) server 120. In some embodiments, the third party application 116 may be associated with any organization that may conduct transactions with or provide services to the users of the client device 106. For example, the third party application 116 may be associated with a social network service (e.g., Facebook®, Twitter®, Google+®, Pinterest®, LinkedIn®, or the like) that may provide a platform for members to build and maintain social networks and relations among other members. Such a social network service may allow members to share ideas, pictures, posts, activities, events, and interests with other members of the social network.

Turning specifically to the network-based content publisher 102, the API server 120 and a web server 118 are coupled to, and provide programmatic and web interfaces respectively to an application server 122. The application server 122 may, for example, host one or more applications 110, which may provide a number of content publishing and viewing functions and services to users that access the network-based content publisher 102. The application server 122 may further host a plurality of user accounts for users of the network-based content publisher 102, which may be stored in a database 128.

As illustrated in FIG. 1, the application server 122 may host a social graph maintenance application 124, which may provide social graph maintenance services to users of the network-based content publisher 102. For example, the social graph maintenance application 124 may analyze social graphs of users to identify nodes that are lacking in relevance to the users and automatically eliminate the relationships each user has with such nodes.

As illustrated in FIG. 1, the application server 122 may be coupled via the API server 120 and the web server 118 to the communication network 104, for example, via wired or wireless interfaces. The application server 122 is, in turn, shown to be coupled to a database server 126 that facilitates access to the database 128. In some examples, the application server 122 can access the database 128 directly without the need for the database server 126. In some embodiments, the database 128 may include multiple databases that may be internal or external to the network-based content publisher 102.

The database 128 may store data pertaining to various functions and aspects associated with the network system 100 and its users. For example, user accounts for users of the network-based content publisher 102 may be stored and maintained in the database 128. Each user account may comprise user data that describes aspects of a particular user. The user data may include demographic data, user preferences, and financial information.

The user data may also include a record of user activity, consistent with some embodiments. Accordingly, the network-based content publisher 102 may monitor, track, and record the activities and interactions of a user, using one or more devices (e.g., client device 106), with the various modules of the network system 100. Each user session may be stored in the database 128 as part of an activity log and each user session may also be maintained as part of the user data. Accordingly, in some embodiments, the user data may include past keyword searches that users have performed, web pages viewed by each user, products added to a user wish list or watch list, products added to an electronic shopping cart, and products that the users own.

While the social graph maintenance application 124 is shown in FIG. 1 to form part of the network-based content publisher 102, it will be appreciated that, in alternative embodiments, the social graph maintenance application 124 may form part of a service that is separate and distinct from the network-based content publisher 102. Further, while the network system 100 shown in FIG. 1 employs client-server architecture, the present inventive subject matter is, of course, not limited to such an architecture, and could equally well find application in an event-driven, distributed, or peer-to-peer architecture system, for example. The various functional components of the application server 122 may also be implemented as standalone systems or software programs, which do not necessarily have networking capabilities. It shall be appreciated that although the various functional components of the network system 100 are discussed in the singular sense, multiple instances of one or more of the various functional components may be employed.

Figure 2:
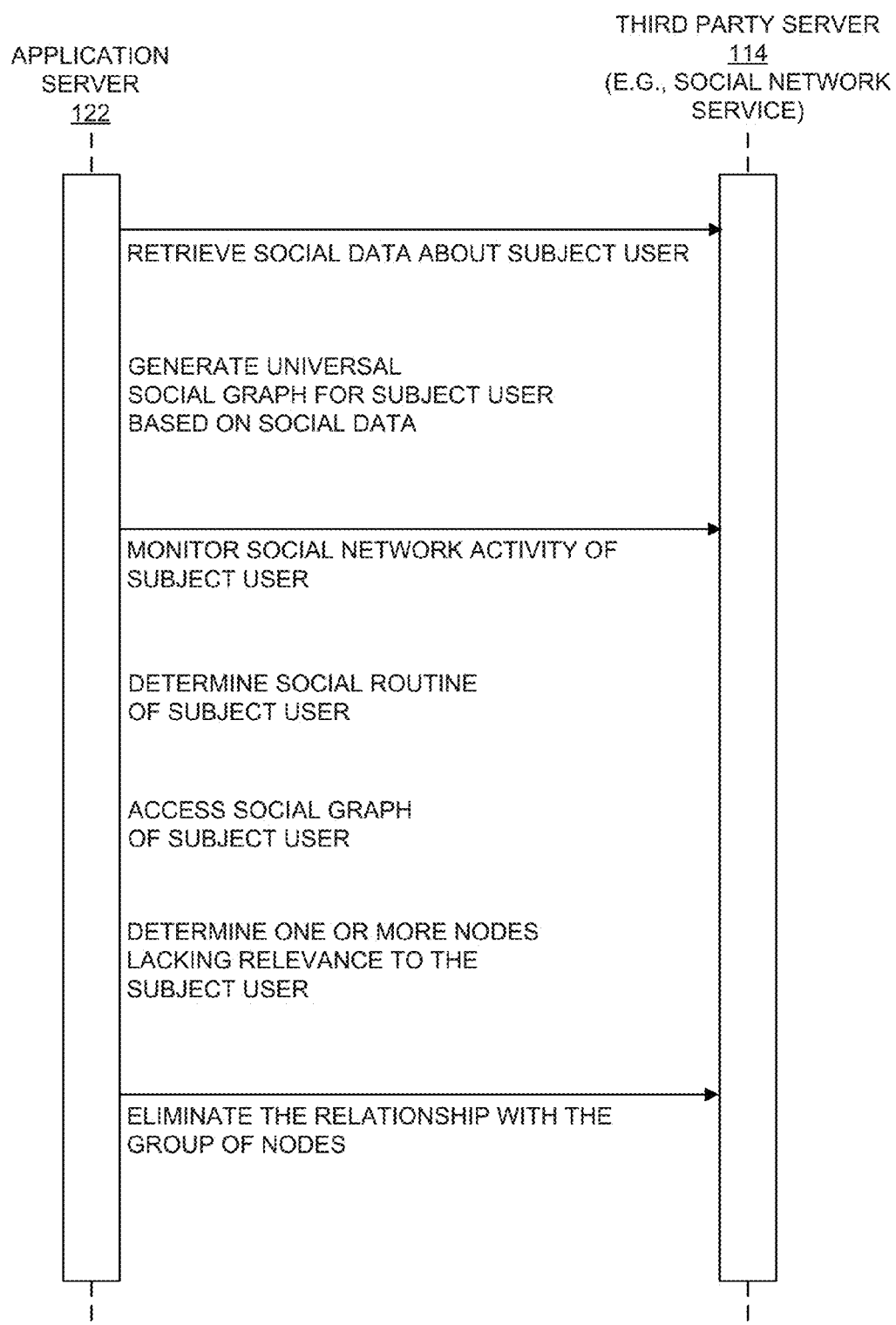
FIG. 2 is an interaction diagram depicting example exchanges between an application server, and at least one third party server, consistent with some embodiments.

FIG. 2 is an interaction diagram depicting example exchanges between an application server, and a third party server, consistent with some embodiments. In particular, FIG. 2 depicts example exchanges between the application server 122 of the network-based content publisher 102 and the third party server 114, which, in this example embodiment, corresponds to a social network service. It shall be appreciated that although FIG. 2 illustrates only a single third party server 114, the exchanges depicted therein may occur between the application server 122 and multiple third party servers 114 hosting different social network services.

A social network service, such as the one depicted in FIG. 2, may provide a representation of each member in the form of a social network profile. The social network profile of each member may contain information about the member (hereinafter referred to as "social data") such as demographic information (e.g., gender, age), geographic information (e.g., a user's hometown, a user's current location), interests, and social network connections of the members. A social network "connection," also referred to as being "connected" on a social network, refers to a relationship between two members of a social network. For purposes of the present disclosure, a social network "connection" may include situations in which there is a reciprocal agreement between members of the social network to be linked on the social network, as well as situations in which there is only a singular acknowledgement of the "connection" without further action being taken by the other member. In the reciprocal agreement situation, both members of the "connection" acknowledge the establishment of the connection (e.g., friends). Similarly, in the singular acknowledgement situation, a member may elect to "follow" or "watch" another member. In contrast to reciprocal agreement, the concept of "following" another member typically is a unilateral operation because it may not call for acknowledgement or approval by the member that is being followed.

Consistent with some embodiments, the social data may further include a record of social network activity for each user of the social network service. For purposes of the present disclosure, "social network activity" collectively refers to social actions performed by users using a social network services. Social actions may include creating, sharing, and interacting with social network entries (e.g., text and image postings, links, messages, notes, invitations). Social actions may be published as one or more social network entries that may be shared with and by other members of the social network. Such social network activities may involve entries that are intended for the public at large as well as entries intended for a particular social network connection or group of social network connections. Depending on the social network, the social network activity may include, for example, include social actions such as an request to be linked on the social network, an activity feed post, a wall post, a status update, a tweet, a pinup, a like, a content share (e.g., content shared from a source such as the network-based content publisher 102), or a check-in.

For purposes of the present disclosure, a "check-in" refers to a service provided by a social network that allows users to "check-in" to a physical space or virtual space and share their location with other users of the social network. In some embodiments, a user may check-in to a specific location by sending a text message to the relevant social network service. Consistent with some other embodiments, users may check-in to a specific location by using a mobile application (e.g., application 110) provided by the social network on a client device (e.g., client device 106). The social network mobile application may use the GPS functionality of the client device 106 to find the current location of the user and allow the user to share this information with other members of the social network.

As shown, the application server 122 may retrieve social data about a subject user from the social network service (e.g., hosted by the third party server 114). From the social data, the application server 122 may generate a social graph for the subject user. In some embodiments, a social graph for the subject user may be included in the retrieved social data, while in other embodiments the social graph may be generated using the retrieved social data. The social graph generated by the application server 122 may be a universal social graph, consistent with some embodiments. The social graph may be "universal" in the sense that it includes aggregated social data about the subject user from multiple social network services. The social graph represents the various relationships of the subject user with other members of a social network, applications, and other content.

Figure 3A:
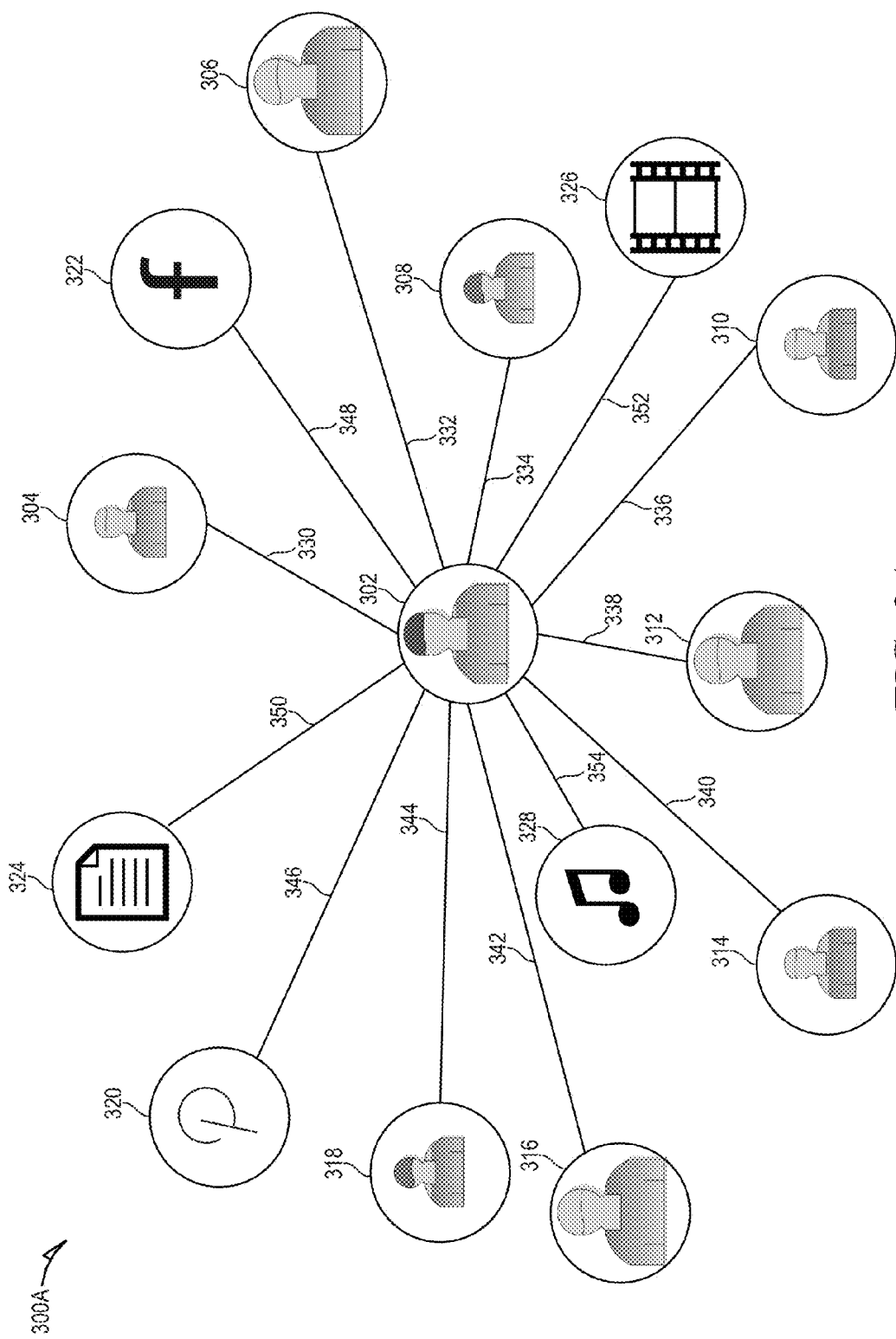
FIG. 3A is a diagrammatic representation of an example universal social graph of a subject user, consistent with some embodiments.

FIG. 3A is a diagrammatic representation of an example universal social graph 300A of a subject user, consistent with some embodiments. The universal social graph 300A may correspond to the social graph generated by the application server 122 as discussed in FIG. 2. As illustrated in FIG. 3, the universal social graph 300A may include a focal node 302, nodes 304-328, and edges 330-354. The focal node 302 represents the subject user (e.g., the user for whom the relationships of the social graph are represented). Each of the nodes 304-328 may represent a social network object, and each of the edges 330-354 represent the subject user's relationship with the social network objects.

A social network object refers to an element or entity that a user may have a relationship with based on one or more interactions with the element or entity facilitated by one or more social network services. For example, nodes 304-318 correspond to members of a social network to which the subject user belongs. The edges 330-344 represent the relationship of the subject user as a social network connection (e.g., "friends," or "followers") of the social network members represented by nodes 304-318. Further, the nodes 326 and 328 correspond to content items the subject user has a relationship with, which are represented by the edges 352-354. A subject user's relationships with a content item may arise from the subject user's social network activity including, for example, viewing the content item, creating a social network post referencing the content item, "liking" or "pinning" the content item, or creating the content item. As used herein, the term "content item" refers to electronic data that is consumed by viewers (e.g., users) on displays, client devices 106 or page/display-based media (e.g., World-Wide Web (WWW) media embodied in browsers and accessible over the Internet). As such, the term "content item" may refer to data associated with readable text, data associated with images, data associate with graphics or video, programmatic content, scripts, or data corresponding to various combinations of these. In some embodiments, the universal social graph 300A may include nodes, such as node 324, that are representative of applications (e.g., applications 110) or other software services to which the subject user is a member, subscribes to, has installed at least one of his devices, or has a user account with.

Consistent with some embodiments, one or more nodes of the universal social graph 300A may represent an entire social network or a social graph hosted by a particular social network service. For example, the nodes 320 and 322 represent social networks of the subject user maintained by Pinterest®, and Facebook®, respectively. The nodes 320 and 322 may, themselves, be comprised of multiple nodes representing social network objects and edges representing a user's relationship to each of the social network objects. In the case of nodes 320 and 322, the relationship represented by edges 346 and 348 is a membership, subscription, or user account with the social network service (e.g., Facebook® and Pinterest®).

Returning to FIG. 2, the application server 122 may monitor or otherwise access ongoing social network activity of the subject user. From the social network activity, the application server 122 may learn a social routine of the subject user. The social routine refers to the regularity with which a subject user interacts with the various nodes comprising the subject user's social graph as well as the actions performed by the subject user in doing so. The social routine may, for example, include a frequency with which the subject user accesses an account (e.g., corresponding to a social network service), a frequency with which a user uses a particular application, a frequency with which the subject user interacts with members of the social network, or a frequency with which the subject user interacts with social network entries. In some embodiments, the social routine provides a baseline metric for which the strength of the subject user's relationship with a particular object may subsequently be determined.

Upon learning the social routine of the subject user, the application server 122 may access the social graph of the subject user (e.g., the previously generated universal social graph 300A). The application server 122 may then determine one or more nodes of the social graph that lack relevance to the user based on the social routine of the user. In some embodiments, the determination that a particular node lacks relevance to the subject user may be based on the strength of the relationship between the subject user and the particular node, which may be determined based on inactivity of the subject user with respect to the particular node. For example, the application server 122 may determine that a particular node, which represents a social network connection of the subject user, lacks relevance to the subject user based on the subject user not having interacted with the social network connection for a period of time.

After determining that one or more nodes lack relevance to the subject user, the application server 122 may eliminate the relationship the subject user has with each social network object represented by the one or more nodes. The elimination of these relationships may include communicating a request to the third party server 114 to eliminate the relationships. As an example of the above operations, the application server 122 may determine that a node corresponding to a social network service lacks relevance to the subject user based on the subject user not having accessed an account of the social networking service for a period of time, or based on the subject user not having interacted with any of the members of the corresponding social network for a period of time. In eliminating the relationship with the social network service, the application server 122 may communicate a request to the social networking service to cancel or delete the subject user's account with the social networking service.

Figure 3B:
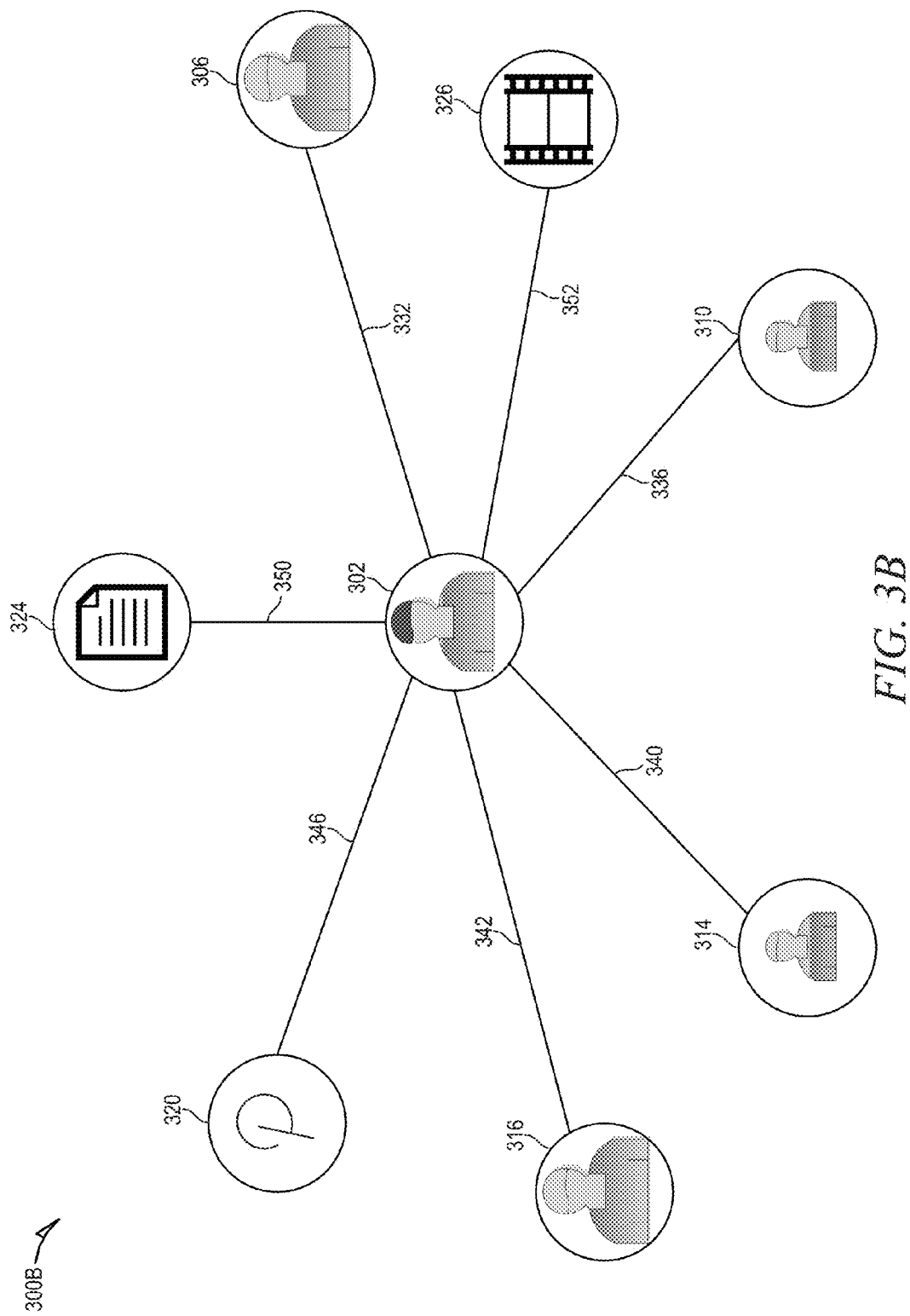
FIG. 3B is a diagrammatic representation of an example universal social graph of the subject with updates based on maintenance operations performed the social graph maintenance application, consistent with some embodiments.

FIG. 3B is a diagrammatic representation of an example universal social graph 300B of the subject user with updates based on maintenance operations performed by the social graph maintenance application 124, consistent with some embodiments. The universal social graph 300B is an updated representation of the social graph of the subject user subsequent to the elimination of nodes that have been determined to lack relevance to the user. In particular, the social graph 300B is an updated view of the universal social graph 300A after the relationship (e.g., represented by edges 330, 334, 338, 344, 348, and 354) with nodes 304, 308, 312, 318, 322, and 328 have been eliminated by the application server 122. As discussed above, the relationship with nodes 304, 308, 312, 318, 322, and 328 may be eliminated based on the nodes 304, 308, 312, 318, 322, and 328 lacking relevance to the subject user represented by focal node 302.

Figure 3C:
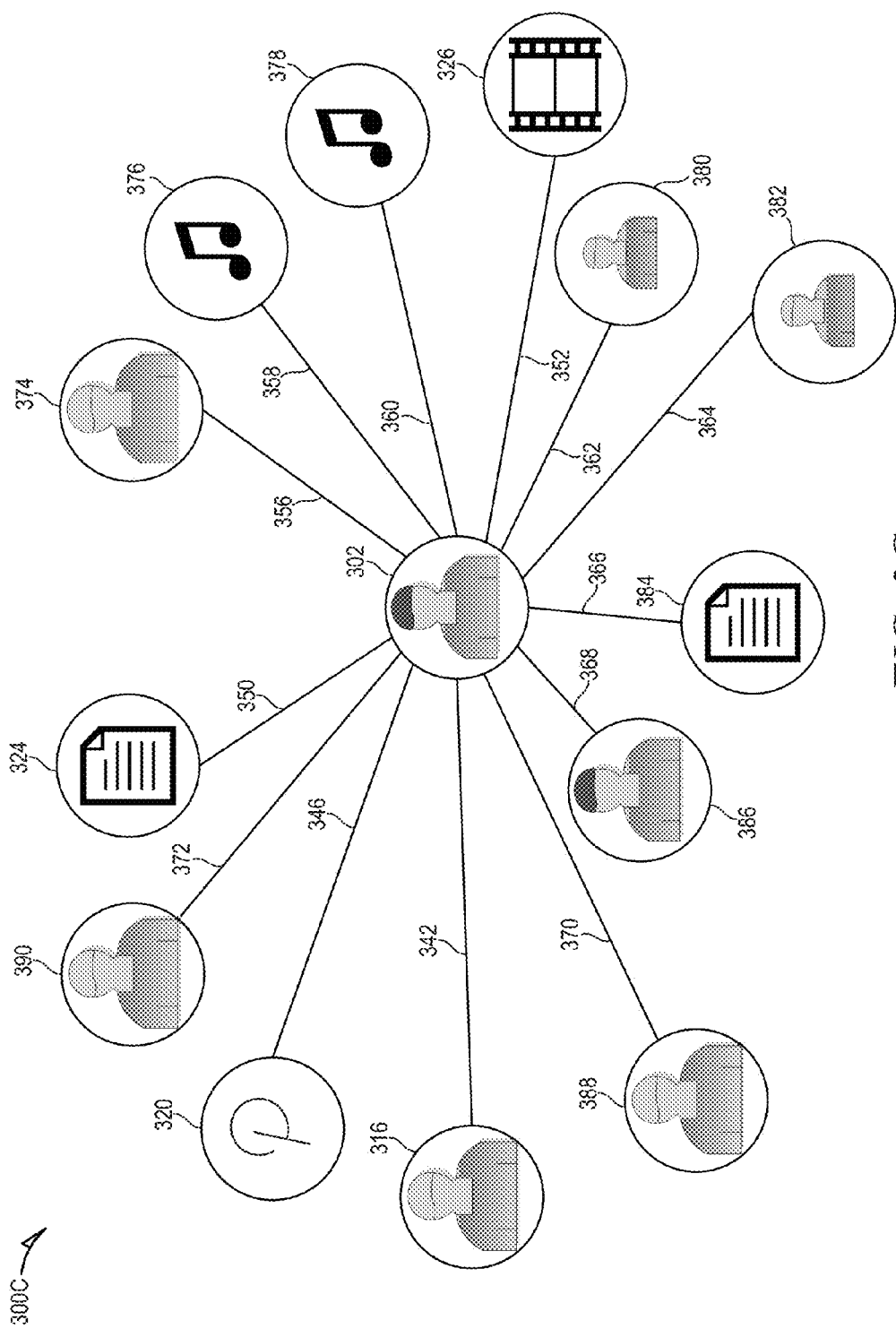
FIG. 3C is a diagrammatic representation of an example social graph of the subject user with further updates based on the social activity of the subject user and further maintenance operations performed by the social graph maintenance application, consistent with some embodiments.

The social graph maintenance application 124 may continue to maintain the social graphs of users and provide periodic updates as the social data of the users change. For example, FIG. 3C is a diagrammatic representation of an example universal social graph 300C of the subject user with further updates based on the social activity of the subject user and further maintenance operations performed by the social graph maintenance application 124, consistent with some embodiments. In particular, the universal social graph 300C illustrated in FIG. 3C is an updated view of the social graph 300B illustrated in FIG. 3B. As shown, the subject user has established a new relationship, represented by edges 356-372, with nodes 374-390, while the social graph maintenance application 124 has eliminated the relationship with nodes 306, 310, and 314 according to the methodologies discussed herein. Depending on the type of object represented by the node, the established new relationship may, for example, be based on a linking of two members on a social network (e.g., becoming "friends"), sharing content (e.g., a social network posting including particular content), frequent interactions with an object (e.g., multiple plays of a particular song or video), commenting on or reviewing content, or other such interactions with the objects.

Figure 4:
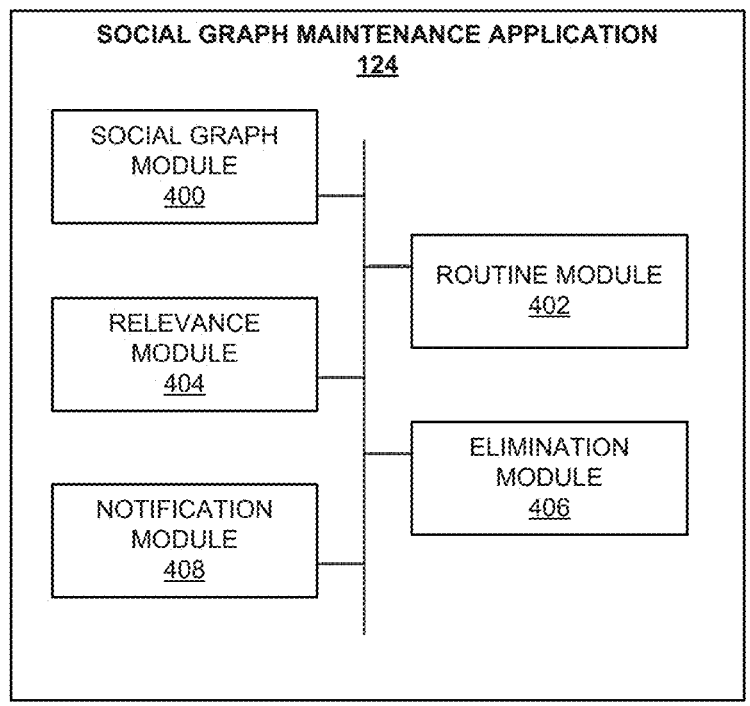
FIG. 4 is a block diagram illustrating various functional modules of a social graph maintenance application, which is provided as part of the network system, consistent with some embodiments.

FIG. 4 is a block diagram illustrating various functional modules of the social graph maintenance application 124, which is provided as part of the network system 100, consistent with some embodiments. The social graph maintenance application 124 is shown as including a social graph module 400, a routine module 402, a relevance module 404, an elimination module 406, and a notification module 408, all configured to communicate with each other (e.g., via a bus, shared memory, a switch, or application programming interfaces (APIs)). The various modules of the social graph maintenance application 124 may, furthermore, access one or more databases 128 via the database servers 126, and each of the various modules of the social graph maintenance application 124 may each be in communication with one or more of the third party applications 116 (e.g., a social network service). Further, while the modules of FIG. 4 are discussed in the singular sense, it will be appreciated that in other embodiments multiple modules may be employed.

The social graph module 400 may be configured to retrieve and analyze social data about users from one or more social network services to generate a social graph (e.g., universal social graphs 300A, 300B, and 300C) for each user. The social graphs generated by the social graph module 400 may, in some embodiments, be universal social graphs in the sense that each includes objects and relationships from multiple network-based services (e.g., multiple social network services). The social graph module 400 may obtain social data about the users via publically accessible APIs provided by each social network service or other network-based services. The social data may include information about each user such as demographic information, user interests, a history of social network activity, a set of social network connections, a social graph, or other information maintained by a social network service (e.g., hosted by third-party server 114). The social graph module 400 may continuously update the social graphs of each user based on changes to each user's social data and also, in response to changes resulting from maintenance operations performed by other modules of the social graph maintenance application 124. A data structure for each social graph may be stored in the database 128 and be associated with a corresponding user account.

The routine module 402 may be configured to determine a social routine of each of the users. In some embodiments, the social routine may include a set of social actions regularly performed by the users with respect to each node comprising each user's social graph. The social routine may include various interactions with a particular social network connection, service, or application (e.g., applications 110) as well as the frequency with which users interact with the particular social network connection, service, or application. Consistent with some embodiments, the routine module 402 may learn a social routine for each node in the social graphs of users. For example, the routine module 402 may determine that a subject user interacts with (e.g., messages) a particular social connection on a monthly basis. As another example, the routine module 402 may determine that a subject user interacts with (e.g., opens or executes) a particular application 110 every day. The social routine module 402 may determine a social routine of the subject user from social data retrieved from social network services, by monitoring the activity of the user on the client device 106, or from a combination of the two. The social routines determined by the routine module 402 may, in some embodiments, serve as the baseline metric for determining the relevance of nodes to the respective users.

The relevance module 404 may be configured to determine a relevance of social graph nodes to the users for which the social graph represents. In some embodiments, the relevance module 404 may determine the relevance of a particular node to a user based on the amount of interactions the user has with the particular node. In some embodiments, the relevance module 404 may determine the relevance of a particular node to a user based on the frequency with which the user interacts with the particular node.

Consistent with some embodiments, the relevance module 404 may determine the relevance of social graph nodes to a user based on the social routine of the user. In these embodiments, the social routine may be used as a basis for determining whether the amount or frequency of interactions with a particular node is at, below, or above the expected level, which in turn provides an indicator of the relevance of the particular node. In instances in which the user may be interacting with a particular node less often than the amount or frequency involved in the social routine of the user, the relevance module 404 may determine that the particular node lacks relevance or has relatively low relevance to the user. Conversely, in instances where the user may be interacting with a particular node more often than the amount or frequency involved in the social routine of the user, the relevance module 404 may determine that the particular node has a relatively high relevance to the user. Thus, in determining the relevance of a particular node to a user, the relevance module 404 may compare the current social network activity of a user with the same user's social routine to identify a difference, if any.

Consistent with some embodiments, the determination of relevance of social graph nodes performed by the relevance module 404 may include calculating a relevance score for each node of a social graph. The calculation of the relevance score by the relevance module 404 may be based any one of the considerations and methodologies discussed herein with respect to the determination of relevance. In some instances, the relevance score may act as an indicator of the strength of the relationship between a subject user (e.g., the user represented in a social graph 300A, 300B, and 300C as the focal node 302) and the nodes of the subject user's social graph. As such, the social graph module 400 may, in some embodiments, maintain a weighting for each social graph edge using the relevance score calculated by the relevance module 404.

The elimination module 406 may be configured to eliminate relationships of users with social graph nodes. The elimination module 406 may eliminate a relationship of a subject user with a particular node based on the particular node lacking relevance to the user as determined by the relevance module 404. The determination that a particular node lacks relevance to a user may include determining that the relevance of a particular node (e.g., as provided by the relevance score of the particular node) is below a predefined threshold.

The elimination of a relationship with a particular node may include communicating with a third party service (e.g., social network service) or application to facilitate the elimination of the relationship. In some instances, such communication may be enabled by an API provided by the third party service. Depending on the type of object represented by the node, the communication may include a request to cancel or unsubscribe to a particular service (e.g., an email subscription service), a request to remove a social network connection (e.g., unfollowing or defriending), a request to remove a profile attribute or other social data attribute (e.g., an interest listed in a social network profile or a "like" of a particular content item), a request to cancel a membership (e.g., a social network membership), or a request to delete a profile provided by the third party application 116 or service. In some embodiments, the elimination of the relationship with a particular node may include uninstalling one or more applications 110 or causing one or more applications 110 to be uninstalled.

The notification module 408 may be configured to generate and deliver notifications to users regarding their respective social graphs. Such notifications may include an indication that a particular object (e.g., a social network connection, a social network service, an application, or a content item) is being interacted with infrequently (e.g., the particular node lacks relevance to the user). Such notifications may further provide suggestions to users such as increasing the frequency of interactions with the object, using a different means of interacting with the objects, or manually eliminating the relationship with the object.

The notification module 408 may utilize any one of a number of message delivery networks and platforms to deliver notifications to users. For example, the notification module 408 may deliver push notifications (e.g., via a pertinent push notification service), electronic mail (e-mail), instant message (IM), short message service (SMS), text, facsimile, or voice (e.g., voice over IP (VoIP)) messages via a wired network 104 (e.g., the Internet), plain old telephone service (POTS), or wireless (e.g., mobile, cellular, WiFi, WiMAX) networks.

Figure 5:
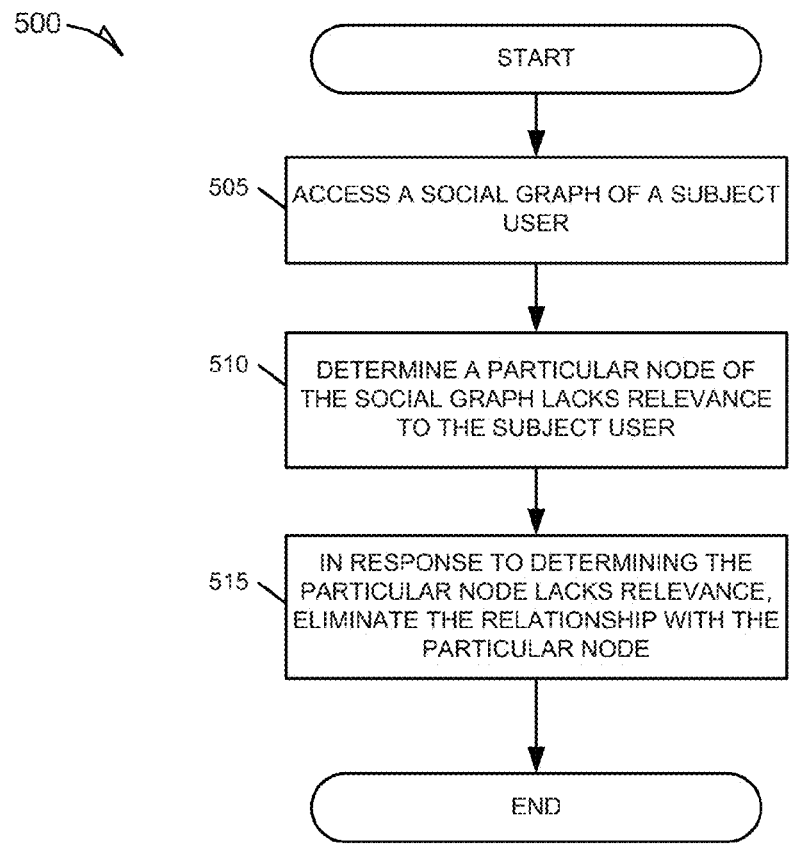
FIG. 5 is a flowchart illustrating a method for maintaining a social graph, consistent with some embodiments.

FIG. 5 is a flowchart illustrating a method 500 for maintaining a social graph, consistent with some embodiments. The method 500 may be embodied in computer-readable instructions for execution by one or more processors such that the steps of the method 500 may be performed in part or in whole by the application server 122, and in particular, the modules comprising the social graph maintenance application 124.

At operation 505, the social graph module 400 may access a social graph (e.g., social graphs 300A, 300B, or 300C) of a subject user. The social graph may be a data structure comprising a focal node, representing the subject user, a plurality of nodes representing objects, and a plurality of edges, representing the subject user's relationship with the objects. The plurality of edges connects the plurality of nodes to the focal node.

At operation 510, the relevance module 404 may determine that a particular node of the social graph lacks relevance to the subject user. For example, the particular node may represent a social network connection of the subject user and the relevance module 404 may determine that the social network connection lacks relevance to the subject user based on the subject user not interacting with the social network connection for a period of time. In another example, the particular node may represent a music streaming service for which the user has a subscription, and the relevance module 404 may determine that the music streaming service lacks relevance to the user based on the user never using the music streaming service. Further details of example operations comprising operation 510 are discussed below in reference to FIG. 6.

At operation 515, in response to determining that a particular node lacks relevance to the subject user, the elimination module 406 may eliminate the relationship with the particular node. Furthering the example of the social network connection presented above, at operation 515, the elimination module 406 may communicate with the applicable social network service to have the social networking connection linked with the subject user be removed. Furthering the example of the music streaming service presented above, at operation 515, the elimination module 406 may communicate a request to the third party provider of the music streaming service to cancel the subject user's subscription with the music streaming service.

Figure 6:
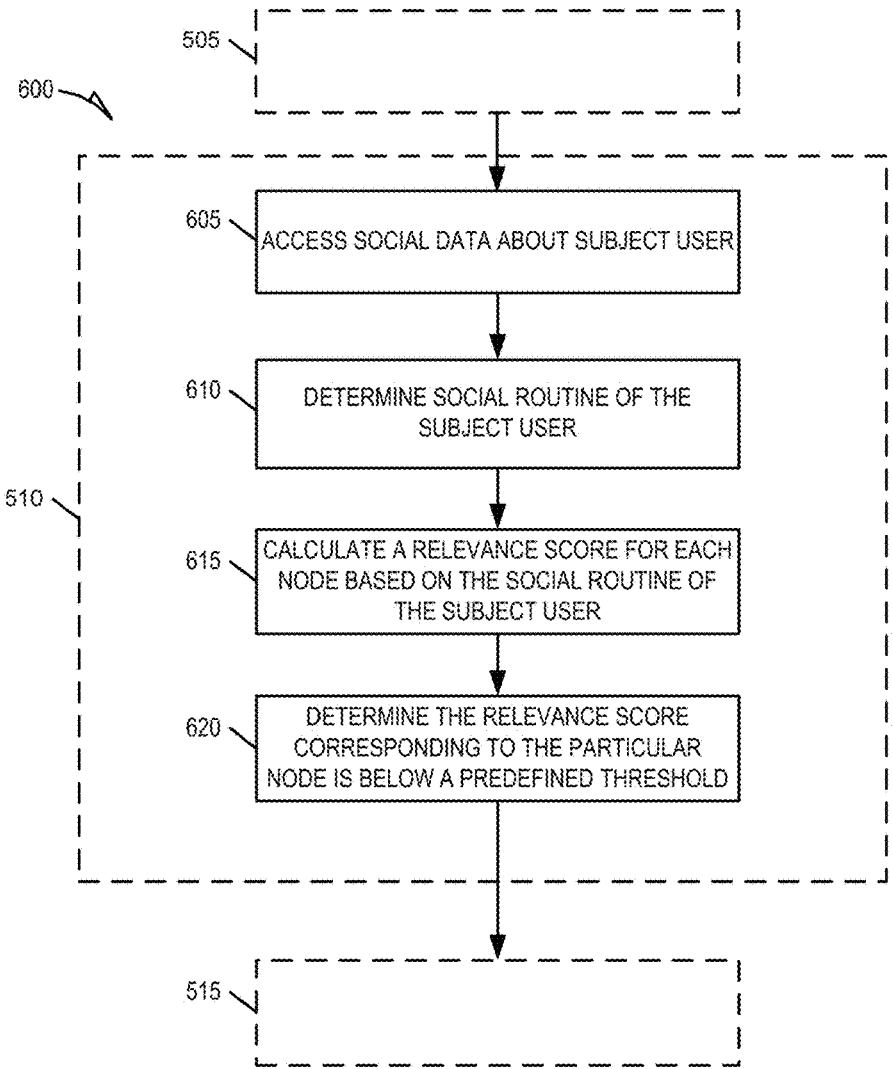
FIG. 6 is a flowchart illustrating a method for determining a node in a social graph of a subject user lacks relevance to the subject user, consistent with some embodiments.

FIG. 6 is a flowchart illustrating a method for determining that a node in a social graph of a subject user lacks relevance to the subject user, consistent with some embodiments. The method 600 may correspond to operation 510, consistent with some embodiments. Further, the method 600 may be embodied in computer-readable instructions for execution by one or more processors such that the steps of the method 600 may be performed in part or in whole by the application server 122, and in particular, the modules comprising the social graph maintenance application 124.

At operation 605, the routine module 402 may access social data about a subject user. The social data may be retrieved from one or more social network services (e.g., via API) or may be retrieved from local storage (e.g., the database 128). From the social data, the routine module 402 may determine a social routine of the subject user, at operation 610. For example, the routine module 402 may determine from the social data that the social routine of the subject user includes daily interactions with every member of a particular social network. In another example, the routine module 402 may determine from the social data that the social routine of the subject user includes using a particular application (e.g., of the applications 110) on a weekly basis. In yet another example, the routine module 402 may determine from the social data that the social routine of the subject user includes logging into a social network service account every two hours.

At operation 615, the relevance module 404 may calculate a relevance score for each node in the social graph of the subject user. The relevance score may provide a measure of relevance of a particular node to the user. The relevance score may be an indicator of the strength of the subject user's relationship with each respective node, consistent with some embodiments. The relevance score for each node may be based on the activity, or lack thereof, of the subject user with respect to each node. For example, nodes with which the subject user interacts with frequently will have a higher relevance score than nodes with which the subject user never interacts with.

The calculation of the relevance score may include comparing the current activity of the subject user with the social routine with respect to each node of the social graph of the subject user, consistent with some embodiments. In this manner, the relevance module 404 may calculate a relatively high relevance score for nodes with which the user currently interacts with in accordance with the applicable social routine (e.g., the social routine of the subject user with respect to each respective object) or at a level in excess of the social routine. Similarly, the relevance module 404 may calculate a relatively low relevance score for nodes with which the user currently interacts with at a level below that of the social routine.

At operation 620, the relevance module 404 may determine that the relevance score of the particular node is below a predefined threshold. As a result, the relevance module 404 may determine that the particular node lacks relevance to the subject user. The predefined threshold may be based on user preferences or a default value, consistent with some embodiments.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a FPGA or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium, for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
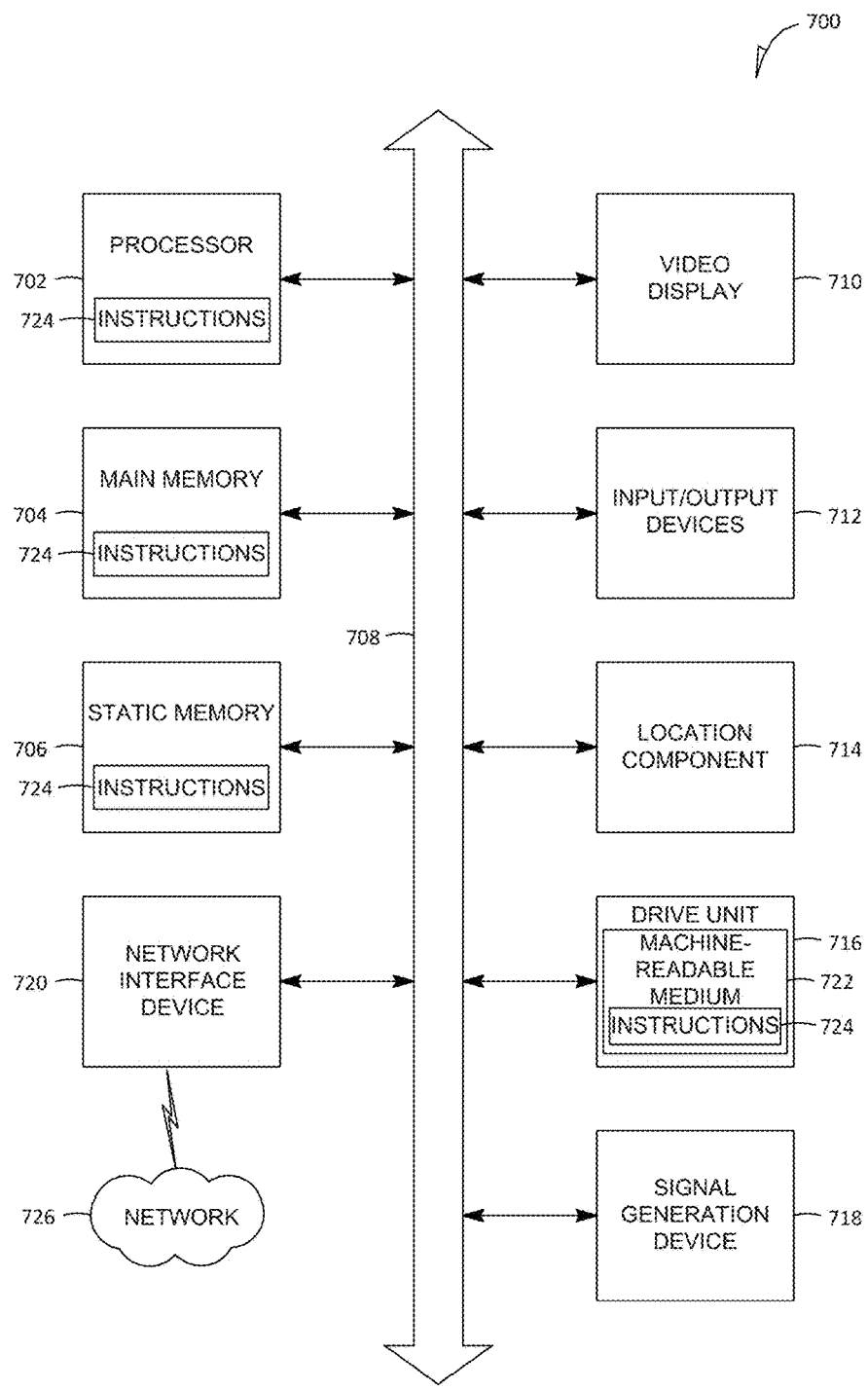
FIG. 7 is a diagrammatic representation of a machine in the example form of a computer system within which a set of instructions for causing the machine to perform any one or more of the methodologies discussed herein may be executed.

FIG. 7 is a diagrammatic representation of a machine in the example form of a computer system 700 within which a set of instructions for causing the machine to perform any one or more of the methodologies discussed herein may be executed. The computer system 700 may correspond to client device 106, third party server 114, or application server 122, consistent with some embodiments. The computer system 700 may include instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a STB, a PDA, a cellular telephone, a smart phone (e.g., iPhone®), a tablet computer, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes one or more input/output (I/O) devices 712, a location component 714, a drive unit 716, a signal generation device 718 (e.g., a speaker), and a network interface device 720. The I/O devices 712 may, for example, include a keyboard, a mouse, a keypad, a multi-touch surface (e.g., a touchscreen or track pad), a microphone, a camera, and the like.

The location component 714 may be used for determining a location of the computer system 700. In some embodiments, the location component 714 may correspond to a GPS transceiver that may make use of the network interface device 720 to communicate GPS signals with a GPS satellite. The location component 714 may also be configured to determine a location of the computer system 700 by using an internet protocol (IP) address lookup or by triangulating a position based on nearby mobile communications towers. The location component 714 may be further configured to store a user-defined location in main memory 704 or static memory 706. In some embodiments, a mobile location enabled application may work in conjunction with the location component 714 and the network interface device 720 to transmit the location of the computer system 700 to an application server 122 or third party server 114 for the purpose of identifying the location of a user operating the computer system 700.

In some embodiments, the network interface device 720 may correspond to a transceiver and antenna. The transceiver may be configured to both transmit and receive cellular network signals, wireless data signals, or other types of signals via the antenna, depending on the nature of the computer system 700.

Machine-Readable Medium

The drive unit 716 includes a machine-readable medium 722 on which is stored one or more sets of data structures and instructions 724 (e.g., software) embodying or used by any one or more of the methodologies or functions described herein. The instructions 724 may also reside, completely or at least partially, within the main memory 704, static memory 706, and/or within the processor 702 during execution thereof by the computer system 700, with the main memory 704, the static memory 706, and the processor 702 also constituting machine-readable media.

Consistent with some embodiments, the instructions 724 may relate to the operations of an operating system (OS). Depending on the particular type of the computer system 700, the OS may, for example, be the iOS® operating system, the Android® operating system, a BlackBerry® operating system, the Microsoft® Windows® Phone operating system, Symbian® OS, or webOS®. Further, the instructions 724 may relate to operations performed by applications 110 (commonly known as "apps"), consistent with some embodiments. One example of such an application 110 is a mobile browser application that displays content, such as a web page or a user interface using a browser.

While the machine-readable medium 722 is shown, in an example embodiment, to be a single medium, the term "machine-readable medium" may include a single medium or multiple media (e.g., a centralized or distributed database, and/or associated caches and servers) that store the one or more data structures or instructions 724. The term "machine-readable medium" shall also be taken to include any tangible medium that is capable of storing, encoding, or carrying instructions (e.g., instructions 724) for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory including, by way of example, semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The invention claimed is:

1. A system comprising:
a non-transitory memory storing instructions;
a processor configured to execute the instructions to cause a system to:
retrieve, by a social graph module, social data of a subject user, the social data including entities that have a relationship with the subject user based on one or more interactions by the subject user with a plurality of social network services;
analyze, by the social graph module, the social data retrieved and generate a social graph based in part on the social data analyzed, the social graph comprising a plurality of nodes, the plurality of nodes including a focal node representing the subject user, a remainder of the plurality of nodes each representing one or more objects having the relationship with the subject user, the one or more objects corresponding to the entities that have a relationship with the subject user;
learn, by a relevance module, a social routine of the subject user using the interactions by the subject user with the remainder of the plurality of nodes;
calculate, by the relevance module, a relevance score for each node of the remainder of the plurality of nodes, the relevance score for a given node being an indicator of an amount or frequency of interaction between the subject user and the given node, wherein the relevance score is based at least in part on at least one of: a frequency with which the subject user accesses a social network account, a frequency with which the subject user uses a particular application, a frequency with which the subject user interacts with members of the plurality of social network services, and a frequency with which the subject user interacts with the entities that have a relationship with the subject user;
determine, by the relevance module, that a particular node lacks relevance to the subject user based on the particular node being associated with a particular relevance score having a value below a predefined threshold; and
eliminate, by the elimination module, the relationship of the subject user with the particular node in response to determining that the particular node lacks relevance to the subject user, based on the particular relevance score having a value below the predefined threshold, where the particular node is removed from the social graph to create a maintained social graph.

2. The system of claim 1, wherein the social graph module is further configured to:
- retrieve new social data about the subject user from one or more social network services;
- analyze the new social data to generate an updated maintained social graph of the subject user; and
- store the updated social graph of the subject user.

3. The system of claim 1, wherein the social graph is obtained from a social network service.

4. The system of claim 1, wherein the one or more objects represented by the nodes are selected from a group consisting of a member of a social network, a content item, a social network service, an application, and a web page.

5. The system of claim 1, further comprising a notification module to provide an indication to the subject user regarding a frequency of interaction with the particular node.

6. The system of claim 1, wherein the elimination module is to eliminate the relationship by communicating a request to a social network service corresponding to the particular node to facilitate the elimination of the relationship with the particular node.

7. The system of claim 1, wherein the particular node is removed from the social graph by cancelling a social network membership.

8. The system of claim 1, wherein the particular node is removed from the social graph by presenting a request for deletion from a profile provided by a third party application.

9. A method for updating a social graph comprising:
- accessing a social graph of a subject user, the social graph comprising a plurality of nodes, the plurality of nodes including a focal node representing the subject user, a remainder of the plurality of nodes each representing one or more objects having a relationship with the subject user;
- learning a social routine of the subject user using interactions between the subject user and the remainder of the plurality of nodes;
- calculating a relevance score for each node of the remainder of the plurality of nodes, the relevance score for a given node being an indicator of an amount or frequency of interaction between the subject user and the given node, wherein the relevance score is based at least in part on at least one of: a frequency with which the subject user accesses a social network account, a frequency with which the subject user uses a particular application, a frequency with which the subject user interacts with members of a social network service, and a frequency with which the subject user interacts with the one or more objects having a relationship with the subject user;
- determining a particular node lacks relevance to the subject user based on the particular node being associated with a particular relevance score having a value below a predefined threshold; and
- in response to the determining the particular node lacks relevance to the subject user based on the particular relevance score having a value below the predefined threshold, eliminating the relationship of the subject user with the particular node by removing the particular node from the social graph to produce a maintained social graph.

10. The method of claim 9, further comprising:
- obtaining new social data about the subject user from one or more social network services;
- analyzing the new social data to generate an updated maintained social graph of the subject user; and
- storing the updated social graph of the subject user.

11. The method of claim 9, wherein accessing the social graph of the subject user comprises retrieving the social graph from a social network service.

12. The method of claim 9, wherein the one or more objects represent one or more members of a social network and wherein the relationship with the subject user is a social network connection.

13. The method of claim 9, wherein eliminating the relationship with the particular node comprises communicating with a network-based entity corresponding to the particular node to eliminate the relationship with the particular node.

14. The method of claim 9, wherein the particular node corresponds to an entire social network of the subject user maintained by a particular social network service.

15. A non-transitory machine-readable storage medium embodying instructions that, when executed by a machine, cause the machine to perform operations comprising:
- accessing a social graph of a subject user, the social graph comprising a plurality of nodes, the plurality of nodes including a focal node representing the subject user, a remainder of the plurality of nodes each representing one or more objects having a relationship with the subject user;
- learning a social routine of the subject user using interactions between the subject user and the remainder of the plurality of nodes;
- calculating a relevance score for each node of the remainder of the plurality of nodes, the relevance score for a given node being an indicator of an amount or frequency of interaction between the subject user and the given node, wherein the relevance score is based at least in part on at least one of: a frequency with which the subject user accesses a social network account, a frequency with which the subject user uses a particular application, a frequency with which the subject user interacts with members of a social network service, and a frequency with which the subject user interacts with the one or more objects having a relationship with the subject user;
- determining a particular node lacks relevance to the subject user based on the particular node being associated with a particular relevance score having a value below a predefined threshold; and
- in response to the determining the particular node lacks relevance to the subject user based on the particular relevance score having a value below the predefined threshold, eliminating the relationship of the subject user with the particular node by removing the particular node from the social graph to produce a maintained social graph.

* * * * *